T. G. SPRINGER.
Wagon-Brake.
No. 59,285.
Patented Oct. 30, 1866
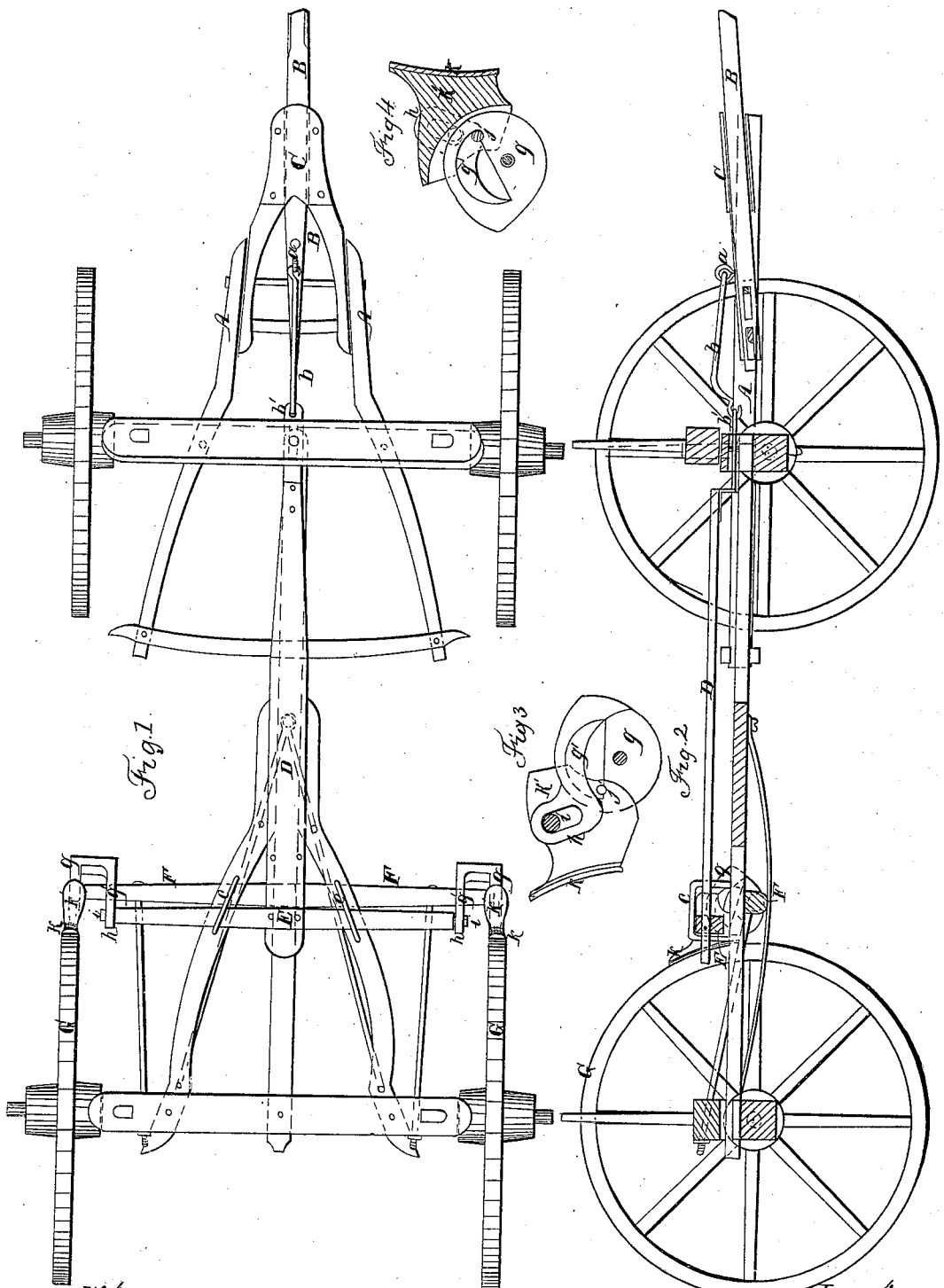

UNITED STATES PATENT OFFICE.

T. G. SPRINGER, OF CONNEAUTVILLE, PENNSYLVANIA.

IMPROVEMENT IN WAGON-BRAKES.

Specification forming part of Letters Patent No. 59,285, dated October 30, 1866.

*To all whom it may concern:*

Be it known that I, T. G. SPRINGER, of Conneautville, in the county of Crawford and State of Pennsylvania, have invented an Improved Wagon-Brake; and I do hereby declare that the following is a full, clear, and exact description thereof, reference being had to the accompanying drawings, making a part of this specification, in which—

Figure 1 is a plan view of a wagon having my improved brake applied to it. Fig. 2 is a longitudinal section taken in a vertical plane through the center of Fig. 1. Fig. 3 is an enlarged view of one of the brake-shoes. Fig. 4 is a vertical section through one of the brake-shoes.

Similar letters of reference indicate corresponding parts in the several figures.

This invention relates to an improvement on that class of wagon-brakes in which the tongue of the wagon is allowed to have a longitudinally-sliding movement, which movement is imparted to the transverse brake-bar, so as to automatically apply and release the brakes.

The object of my invention is to so construct the brake-shoes, and combine them with a stationary and a movable bar, that these shoes shall operate to check the wheels only in descending a hill, as will be hereinafter described.

To enable others skilled in the art to understand my invention, I will describe its construction and operation.

To the hounds A A of a common running-gear I apply a longitudinally-sliding tongue, B, by means of a hinged fork, C. This fork C, instead of being formed on the tongue, is made separate, and pivoted between the hounds A by a transverse rod, as shown in the drawings. The tongue is applied to this fork so as to vibrate with it, and also so as to move in a direction with its length.

Near the rear end of the tongue B is an eye, *a*, to which a rod, *b*, is pivoted, which rod is again pivoted to the slotted plate *b'*, that is secured to the front end of a longitudinally-sliding bar, D, as shown in Figs. 1 and 2. The slotted plate *b'* is connected between the front end of the perch and the bolster by the king-pin, which pin passes through the oblong slot through said plate.

The bar D extends back a suitable distance and has a horizontal transverse brake-bar, E, secured to its rear end, which bar is held down in place, but allowed to slide freely by means of the staples *c c* on the diagonal braces of the rear axle.

Beneath the bar E and a little in advance of it is a horizontal transverse bar, F, the ends of which terminate in a plane with the rear wheels G G, as shown in Fig. 1. This lower bar, F, is rigidly secured to the perch and diagonal braces, so as to serve as bearings for two open segments, *g g*, which are pivoted to its ends. These segments are constructed with semicircular openings through them, and also with curved arms *g' g'* on their inner sides, which latter have slotted enlargements *h h* formed on their ends, as shown in Fig. 3. Through the oblong slots in the enlargements *h* pins *i i* pass and enter the ends of the sliding brake-bar E, so that by moving this bar back and forward the segments *g g* will be vibrated about their axes.

The segments *g g* are intended to serve as supports and guides for the brake-shoes *k k*, and upon these segments the brake-shoes are attached by transverse pins *j*, that pass through the semicircular openings which are made through said segments, as shown in Fig. 4.

The brake-shoes are constructed with side flanges or hoods, *k'*, which receive within them the upper portions of the segments *g*, and prevent anything from getting between the segments and shoes that would be liable to clog them. This is a very important part of my invention, as brakes which are exposed will very soon become inoperative on account of sand, mud, and other substances getting between their shoes and their bearings. These shoes being held loosely by their segments *g*, they will drop down and be caught by the peripheries of the wheels when the bar E is moved backward; and when this bar is moved forward the segments will lift the shoes free from the wheels and hold them in this condition.

The segments are eccentric to their axes of motion, so that the brake-shoes will be moved toward their respective wheels by the backward movement of the brake-bar E, and thus afford a back-brace for each shoe.

It will be seen that the segments *g g* operate upon the shoes as cams when the brake-bar E is moved toward the wheels, or when the wagon is descending a grade, and is moved forward against a check of the team. When the bar E is moved forward again the cams $g$ $g$ then become levers for lifting the shoes away from their wheels.

When the movable bar E is drawn forward the pins $i\ i$ in the end of this bar move downward in slots or toward the axis of the segments $g\ g$, thereby losing leverage and gaining motion to roll the loose shoes from the wheel; then, when the bar E is moved back, pins $i\ i$ move back or out to the ends of their slots and regain the leverage which was lost by the forward movement. By this arrangement the shoes can be moved the proper distance from the wheels by a very slight movement of the tongue and with very little or no jar.

Having described my invention, what I claim as new, and desire to secure by Letters Patent, is—

1. Pivoting eccentrics $g\ g'\ h$, which are constructed substantially as described, to a fixed bar, F, and a movable bar, E, in combination with brake-shoes $k\ k$, or their equivalents, substantially as specified.

2. The hooded brakes-shoe $k$, applied to rocking eccentrics or cams $g$, substantially as described.

3. Connecting the pivoted eccentrics $g\ g$ to the sliding brake-bar E by means of pins passing through slotted portions $h$, substantially as described.

T. G. SPRINGER.

Witnesses:
E. L. LITCHFIELD,
G. F. BOSTWICK.